US008620582B2

(12) United States Patent
Dods et al.

(10) Patent No.: US 8,620,582 B2
(45) Date of Patent: Dec. 31, 2013

(54) DEVICE POSITION METHOD AND APPARATUS USING CELESTIAL OBJECTS

(75) Inventors: Jeffrey Alton Hugh Dods, Kitchener (CA); Nazih Almalki, Waterloo (CA); Christopher Harris Snow, Kitchener (CA); Robert George Oliver, Owen Sound (CA)

(73) Assignee: BlackBerry Limited, Waterloo (CA)

( * ) Notice: Subject to any disclaimer, the term of this patent is extended or adjusted under 35 U.S.C. 154(b) by 327 days.

(21) Appl. No.: 12/984,129

(22) Filed: Jan. 4, 2011

(65) Prior Publication Data

US 2012/0172061 A1    Jul. 5, 2012

(51) Int. Cl.
     *G01C 21/02*      (2006.01)
(52) U.S. Cl.
     USPC .......................................... 701/513; 701/300
(58) Field of Classification Search
     None
     See application file for complete search history.

(56) References Cited

U.S. PATENT DOCUMENTS

| | | | |
|---|---|---|---|
| 5,161,242 A | | 11/1992 | Boulay |
| 8,125,376 B1 * | | 2/2012 | Ashjaee et al. .......... 342/357.23 |
| 2006/0282217 A1 | | 12/2006 | Twitchell |
| 2007/0117078 A1 | | 5/2007 | Bruns |
| 2009/0225155 A1 | | 9/2009 | Hirotani |
| 2009/0326816 A1 | | 12/2009 | Park |
| 2010/0283840 A1 | | 11/2010 | Belenkii et al. |
| 2011/0275408 A1 * | | 11/2011 | Kulik ......................... 455/556.1 |

FOREIGN PATENT DOCUMENTS

JP      2006153473      6/2006

OTHER PUBLICATIONS

Grassroots Mapping Photo Sextant; http://wiki.grassrootsmapping.org/show/PhotoSextant; retrieved Oct. 7, 2010.
StarPilot: State of the Art Celestial Navigation and Piloting Computations; http://www.starpilotllc.com; retrieved on Jan. 4, 2011.
Extended European Search Report dated Jun. 28, 2011. In corresponding application No. 11150118.5.
Celestial Navigation—Wikipedia , http://en.wikipedia.org/wiki/Celestial_navigation. pp. 1-7. Retrieved from the internet Nov. 7, 2011.
English-language translation of Abstract for JP2006153473A-1, www.jpo.go.jp, translated from JPO web site on Nov. 27, 2011.
Office Action mailed Oct. 2, 2013, in corresponding Canadian patent application No. 2,763,104.

\* cited by examiner

*Primary Examiner* — Michael J Zanelli
(74) *Attorney, Agent, or Firm* — Novak Druce Connolly Bove + Quigg LLP

(57) ABSTRACT

A system and method of determining a position of an electronic device is presented herein. An image is displayed having at least one celestial object and a celestial object indicator for selecting a celestial object. The celestial object indicator is overlaid on the at least one celestial object. Data indicating a relative angle of the device with respect to the Earth in at least two dimensions is received at the processor. The time when the celestial object indicator is overlaid on the at least one celestial object is determined. The position of the electronic device is determined by comparing the location of the celestial object in the image data and relative angle information at the time of the indication to a database at least partially stored on the electronic device in response to an indication that the celestial object indicator is overlaid on the at least one celestial object.

20 Claims, 9 Drawing Sheets

DEVICE POSITION METHOD AND APPARATUS USING CELESTIAL OBJECTS

FIELD OF TECHNOLOGY

The subject matter herein generally relates to determining a position of an electronic device based upon a celestial object.

BACKGROUND

With the advent of more robust electronic systems, advancements of electronic devices are becoming more prevalent. Electronic devices can provide a variety of functions including, for example, telephonic, audio/video, and gaming functions. Electronic devices can include mobile stations such as cellular telephones, navigation devices, smart telephones, portable gaming systems, portable audio and video players, electronic writing or typing tablets, handheld messaging devices, personal digital assistants, and handheld computers.

Electronic devices allow users to have an integrated device which can perform a variety of different tasks. For example, an electronic device can be enabled for each of or some of the following functions: voice transmission (cell phones), text transmission (pagers and PDAs), sending and receiving data for viewing of Internet websites, and multi-media messages. Additionally, electronic devices can include one or more applications such as a camera application for capturing photographs or videos.

BRIEF DESCRIPTION OF THE DRAWINGS

Implementations of the present technology will now be described, by way of example only, with reference to the attached figures, wherein.

DETAILED DESCRIPTION

Figure 1:
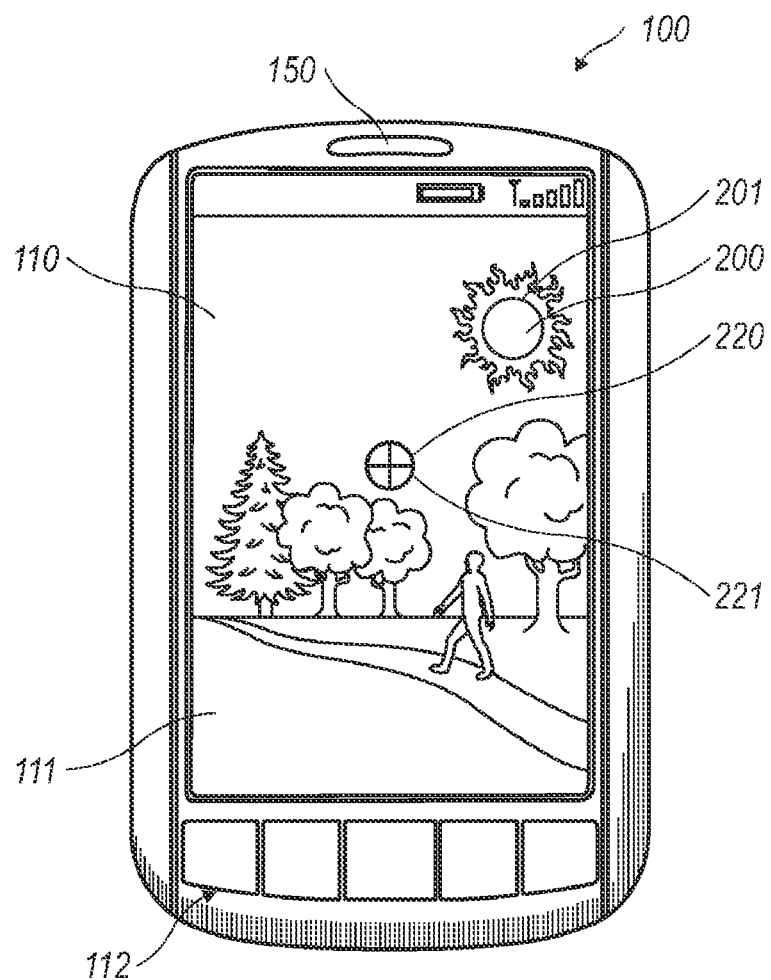
FIG. 1 is an exemplary electronic device displaying an image according to the present technology.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "electronic device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. A "celestial object" as used herein includes astronomical objects that are significant naturally occurring physical entities that are located outside Earth's atmosphere and visible from Earth. "Time" as used herein refers to the year, month, day, hour, minute and second. In at least some implementations, time can include fractions of a second. The images as illustrated herein are not to scale and are provided for illustration of implementations according to the present disclosure.

Exemplary implementations of an electronic device capable of determining a position of the device based upon a celestial object are presented. The position of the electronic device can be determined using the position of the celestial object relative to the electronic device. Image data is acquired that contains at least one celestial object. In order to determine the position of the electronic device, a relative angle of the device is determined with respect to the Earth in at least two dimensions at the time of acquisition of the image data. Additionally, a celestial object indicator for selecting a celestial object is provided on the display of image data. In order to acquire a position of the electronic device, the celestial object indicator is overlaid on the celestial object. The celestial object indicator can be a fixed indicator, a calculated position, a moveable indicator, or any combination thereof. Additionally, the time at which the image is acquired is obtained. In response to an indication that the celestial indicator is overlaid on the celestial object, a determination of position, by the processor of the electronic device, is made by comparing the location of the celestial object in the image data and the relative angle information at the time of the indication to a database at least partially stored on the electronic device. The position of the device is then displayed. In alternative implementations, the position of the device can be transmitted to a remote device.

The indication that the celestial object indicator is overlaid on the at least one celestial object can be based upon an input received from a predetermined key. In other implementations, the indication can be based upon received instructions via a microphone or a touch sensitive device, such as a touch sensitive display or navigation tool. In other implementations, indication that the celestial object indicator is overlaid on the at least one celestial object is determined using a vector relative to the brightest point on the display relative to the celestial object indicator.

The angle data can be received from at least one sensor in the device. As explained below, the at least one sensor is at least an accelerometer. In at least one implementation, the at least one sensor can also include a magnetometer. Using the at least one sensor and the celestial object indicator has an advantage over other methods which involve determination of the celestial object in relation to the horizon, as in many instances the horizon is obscured or difficult to discriminate, such as in a city and mountainous terrain, among other locations. The angle data can contain three dimensions of the electronic device relative to the Earth.

Additionally in at least one implementation, a list of celestial objects can be displayed. A selection of one of the listed celestial objects can be made and the selected celestial object is used in the comparison. In response to the selection of one of the listed celestial objects, the celestial object indicator displayed can change in dependence thereon. For example, the celestial object indicator can be sized to provide for substantially complete overlaying of the celestial object indicator on the at least one celestial object. In another implementation, the celestial object is selected based upon the time at the electronic device. The celestial object is chosen as the Sun if the time is during daylight hours, and the celestial object is one of the Moon or North Star if the time is during the night.

FIG. 1 illustrates a front view of an exemplary electronic device. The illustrated electronic device 100 is a smartphone but can also be a netbook, an electronic tablet, an electronic pad, a personal digital assistant (PDA), or any other similar electronic device which includes a display, a processor communicatively coupled to the display, and a camera module. The electronic device 100 includes a display screen 110 on which photos, videos, user interfaces (UIs), or any other graphical item can be displayed. The display screen 110 can be a liquid crystal display (LCD), a light emitting diode (LED) display, an active matrix organic light emitting diode display (AMOLED), a nanocrystal display, a nanotube display, a touch-sensitive display screen, or any other display screen on which graphical or visual items can be displayed. Additional user input devices such as keys 112 can be located below the display screen 110. In at least another implementation, the keys 112 can be located on the side of the display or on a separate component from the display. In other implementations, a navigation tool can be included. The navigation tool can include an optical trackpad, an optical trackball, a trackball, a jog dial, an omnidirectional joystick, or any other navigation tool at which inputs can be received and output to alter the display screen 110. The keys 112 can be press-actuable keys, touch-sensitive keys, capacitive keys, or any other similar key that allows for the input of data to a processor of the electronic device 100 upon user-engagement with the key 112. Additionally, a speaker 150 is shown.

An example of an image acquired by the camera module of the electronic device is shown on the display 110 of the electronic device. The image 111 includes a person walking on a path with trees in the distance. The celestial object 200 in the image 111 is the Sun 201. Other examples of celestial objects 200 will be provided below. The celestial object indicator 220 in the image is a cross-hair inside a circle 221. The celestial object indicator 220 as described above can be a fixed indicator or it can vary in relation to the celestial object of interest, as described below.

Figure 2:
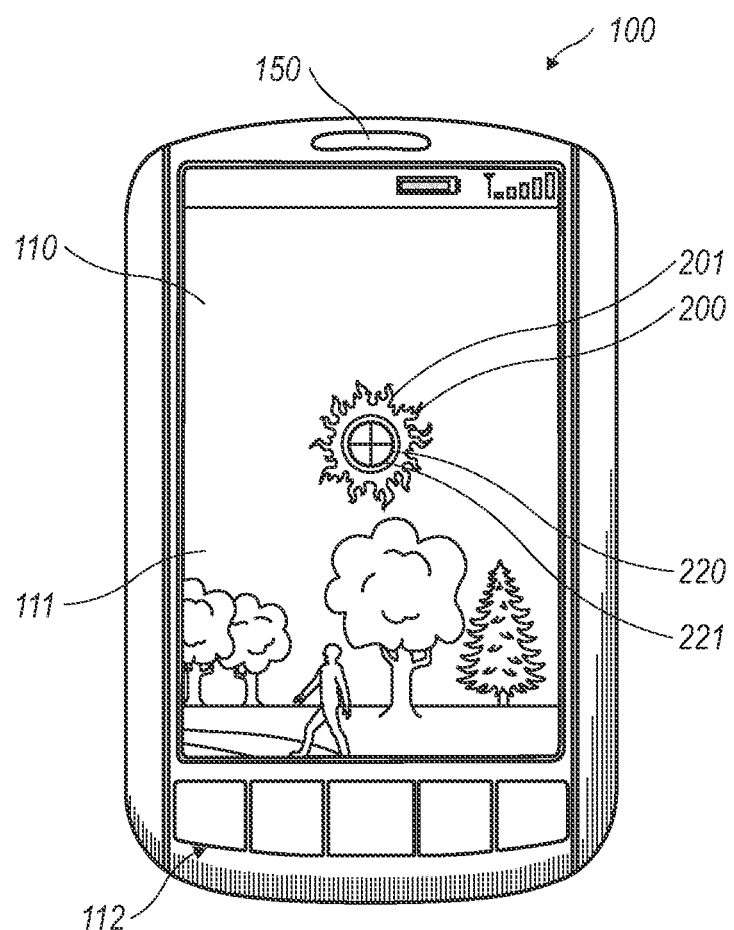
FIG. 2 is another exemplary image displayed on the electronic device illustrated in FIG. 1.

In order to determine the position of the electronic device 100, the electronic device 100 can be moved until the celestial object indicator 220 is overlaid on the Sun 201. As illustrated in FIGS. 1 and 2, the celestial object indicator 220 is a fixed indicator on the display 110 such that it remains in the center of the image 111 on the display 110. In FIG. 1, the Sun 201 is located in an upper right corner of the image 111. In FIG. 2, the Sun 201 is located in the center of the image 111 on the display 110. As shown, the celestial object indicator 220 is overlaid on the Sun 201. In the examples illustrated in FIGS. 1 and 2, the user of the device 100 moves the device 100 until the image 111 displayed on the display shows the celestial object indicator 220 overlaid on the celestial object 200, the Sun 201. As the Sun 201 is a bright object, the user would never look directly at the Sun 201. Rather, the user would start off by launching the celestial navigation program and holding the electronic device 100 such that it faced in the general direction of the Sun 201. When the device 100 is held in such a fashion, an image 111 such as the one shown in FIG. 1 can be produced. The image 111 can be a video image or a real time image such that the image 111 changes as the electronic device 100 moves. When the device 100 is configured to display a video image, the image 111 changes on the display 110 as the user moves the device. In order to find a position of the electronic device 100, the user moves the electronic device 100 until the celestial object indicator 220 is overlaid on the Sun 201 as shown in FIG. 2.

Once the celestial object indicator 220 is overlaid on the celestial object 200, the user can provide an indication that the celestial object indicator 220 is overlaid on the celestial object 200. Once this indication is received by the processor a determination of the current position of the electronic device 100 can be made. Using sensor information regarding the angle of the electronic device 100 relative to the Earth and the time at which the celestial object indicator 220 was overlaid on the celestial object 200, a database is consulted that provides information about celestial object 200 relative to the Earth. Using that information, the device 100 can determine the present position of the electronic device 100.

In another implementation, the celestial object indicator 200 can be a non-fixed indicator, such that the location of the celestial object indicator on the display 110 is movable. For example, if an image is acquired, the operator can later position the celestial object indicator over the celestial object image shown on the image. The angle data and time data can be recorded at the time the image is acquired and further processed once the celestial object indicator is overlaid on the celestial object in the image. An indication that the celestial object indicator is overlaid on the celestial object can proceed according the description provided herein.

In other implementations, the user does not have to provide an indication that the celestial object indicator 220 is overlaid on the celestial object 200. The processor can determine the location of a brightest spot nearest to the celestial object indicator 220. Then, a vector connecting the brightest spot nearest to the celestial object indicator 220 is used to determine whether the celestial object indicator 220 is overlaid on the celestial object 200. In an alternative implementation, the processor can further determine the vector between the brightest spot and the celestial object indicator 220 to provide a more accurate estimate of celestial object relative to electronic device 100 and use that determination for determining the position of the electronic device 100.

Figure 3:
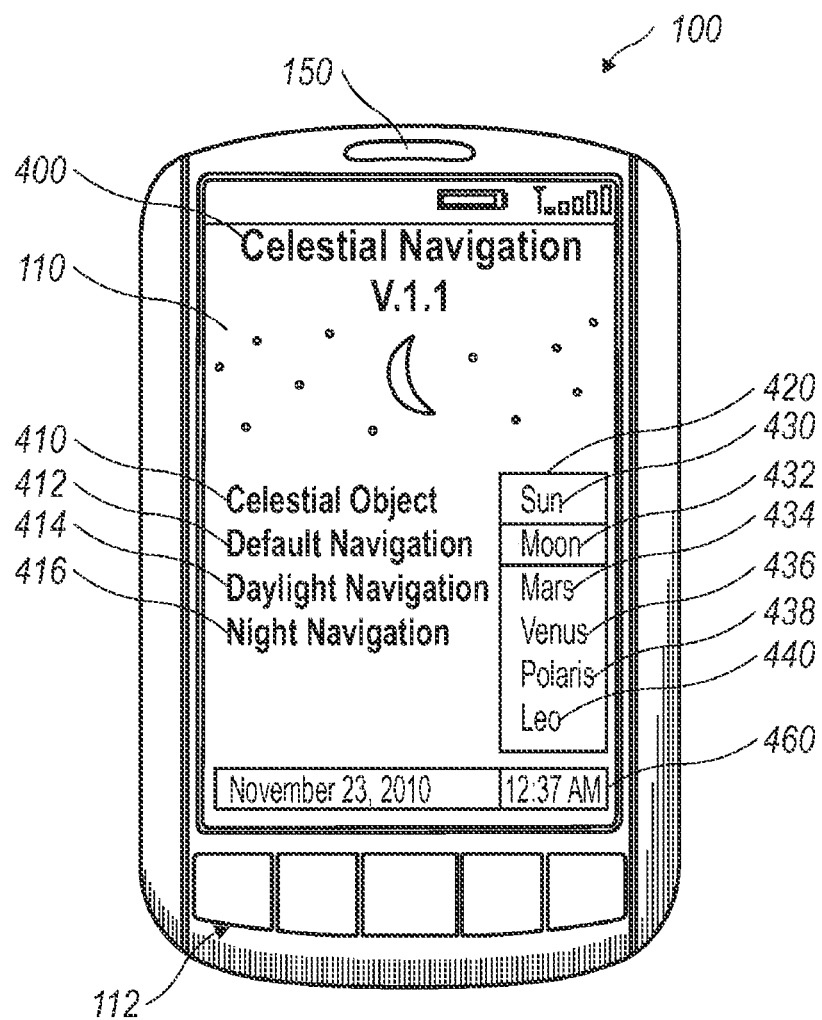
FIG. 3 is a home screen of a celestial navigation program on an exemplary electronic device.

FIG. 3 illustrates an example home screen of a celestial navigation program according the present disclosure. On the illustrated home screen 400, options from celestial navigation program are provided. These options include celestial object 410, default navigation 412, daylight navigation 414, and night navigation 416. A drop down menu 420 is provided when celestial object 410 is selected. As shown, the drop down menu 420 includes the following celestial objects: Sun 430, Moon 432, Mars 434, Venus 436, Polaris 438, and Leo 440. Other implementations according to the present disclosure can contain celestial objects not included on this list, have a different listing, or have fewer celestial objects than listed. For example, only two celestial objects can be provided. In other implementations over fifty celestial objects can be provided. In other implementations, any number of celestial objects can be provided in the menu 420.

When the celestial navigation program is provided with celestial object selection, the user can specify which celestial object will be selected using the celestial object indicator 220. For example, during the day, the Sun 430 can be selected. When the Sun 430 is selected, the celestial navigation program can be used as described above in relation to FIGS. 1 and 2. Additionally, other implementations that provide for selecting the Sun using the celestial object indicator 220 can be implemented.

If it is night and the Moon is visible, the user can select the Moon item 432. In some instances, the Moon may not be visible and another celestial object may be selected such as the ones listed. While only the Sun, Moon, Mars, Venus, Polaris and Leo are listed in the drop down menu 420, other items can be included. In at least one implementation, the listed items in the drop down menu 420 can be user selected.

In other implementations, the listed items in the drop down menu 420 can include only those celestial object(s) that are available in the loaded database(s). For example, if the device has only the Sun and Moon databases stored thereon, only the Sun and Moon can be provided in the drop down menu 420. This allows the user to select a celestial object that can be use for determining the position of the electronic device 100. If the electronic device 100 is connected to a wireless network, additional databases can be available and additional celestial objects can be included. In one example, the database can be stored on a remote server and accessed only when needed. In other implementations, a new selection of a celestial object from the drop down menu 420 causes the electronic device 100 to download at least a portion of the database associated with the selected celestial object from the remote server.

In other implementations, the user can select default navigation. Default navigation can be configured such that a default celestial object is used in determining the position of the electronic device 100. For example, the current time of the electronic device 100 can be used to select whether the Moon or Sun will be used as the celestial object. For example, if the time is such that the Sun is normally visible, then the Sun will be selected. Alternatively, if the time is after sunset and before sunrise, the Moon can be selected as the celestial object of interest. Furthermore, if the Moon is not visible on a particular night, then the default celestial object can be Polaris which is also known as the North Star. In at least one implementation, the default celestial object can use a database to determine the visibility of the Moon during the night. In other implementations, a menu item can be displayed so that the user can select between the Moon and Polaris.

Additionally, as illustrated in FIG. 3, a daylight navigation option 414 can be selected. The daylight navigation option 414 can be preconfigured to provide for daylight navigation based on at least the Sun. In other implementations, if daylight navigation option 414 is selected, the user can be presented with those celestial bodies that can be used in daylight navigation such as the Sun and Moon.

Furthermore, the celestial navigation program as illustrated in FIG. 3 includes a night navigation option 416. If the night navigation option 416 is chosen, the user can be presented with celestial object options, for example Polaris and Moon, for night navigation. In other implementations, the celestial object can be selected using data regarding the visibility of the Moon and other celestial objects.

Additionally, the time 460 is shown on the celestial navigation home screen 400. This time 460 can be based upon the internal clock (not shown) of the electronic device 100. In at least one implementation, the internal clock of the electronic device 100 can be updated by a remote clock such as a clock of the network to which the electronic device 100 is connected. In other implementations, the electronic device 100 can request the time 460 from a remote database when the celestial navigation program is started to update the internal clock of the electronic device 100.

The selection of the menus and options displayed on the celestial navigation home screen 400 can be made using touch selection of the options displayed on the display 110 or using one or more of the buttons 112. Additionally, as mentioned above, a navigation tool can be provided to allow user selection of the options.

Figure 4:
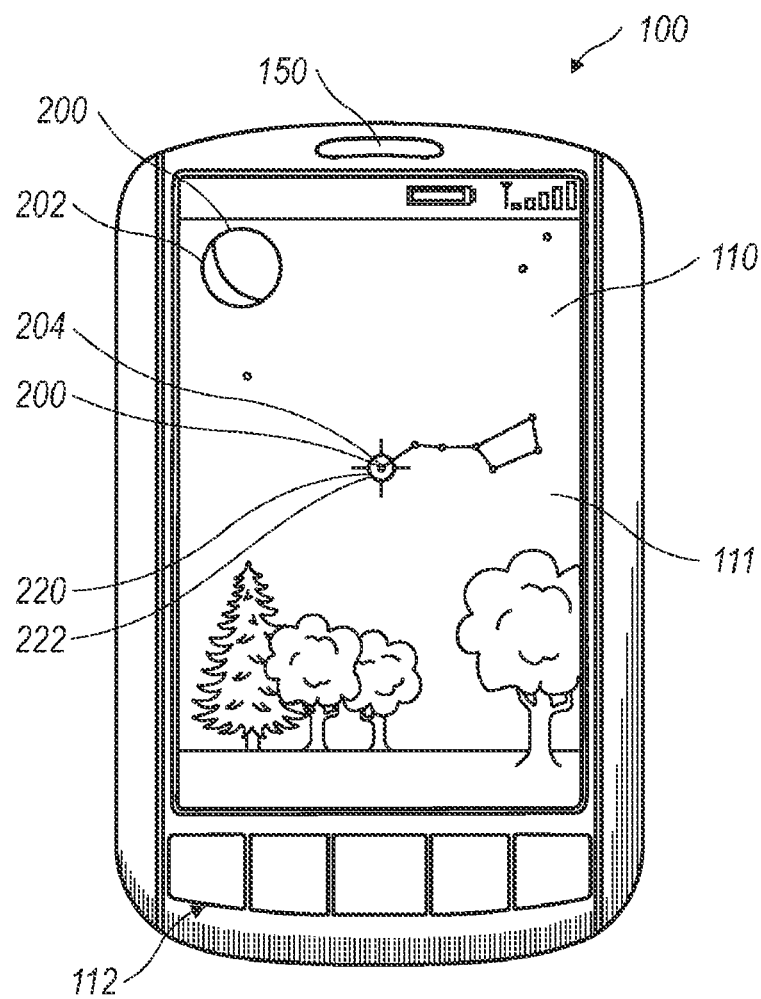
FIG. 4 is another exemplary image displayed on an electronic device according the present technology.

In the image 111 shown on display 110 of FIG. 4, there are two celestial objects 200, namely the Moon 202 and Alkaid 204, a star within the constellation of Ursa Major. In at least one implementation, the star Alkaid 204 can be selected, for example from the drop down menu 420 of FIG. 3. If Alkaid 204 is chosen, the electronic device 100 can begin image acquisition. As illustrated in FIG. 4, the user of the device 100 can point the electronic device 100 in the direction of Ursa Major and move the device until the celestial object indicator 220 is substantially overlaid on Alkaid 204. The user can touch the screen, select a button or speak into a microphone of the device 100 to provide an indication that the celestial object indicator 220 is overlaid on Alkaid 204. The electronic device 100 can indicate that the indication is received by providing a tone through speaker 150 or providing a visual indicator. In other implementations, no indication can be made and instead the position can be provided on the display.

When the celestial object 200 is chosen as described above, the celestial object indicator 220 can change as well. For example, the celestial object indicator 220 shown in FIG. 4 differs from the celestial object indicator 220 of FIGS. 1 and 2. As illustrated in FIGS. 1 and 2, the celestial object indicator 220 is crosshairs within a circle 221. In FIG. 3, the celestial object indicator 220 is crosshairs outside of a circle 222.

Figure 5:
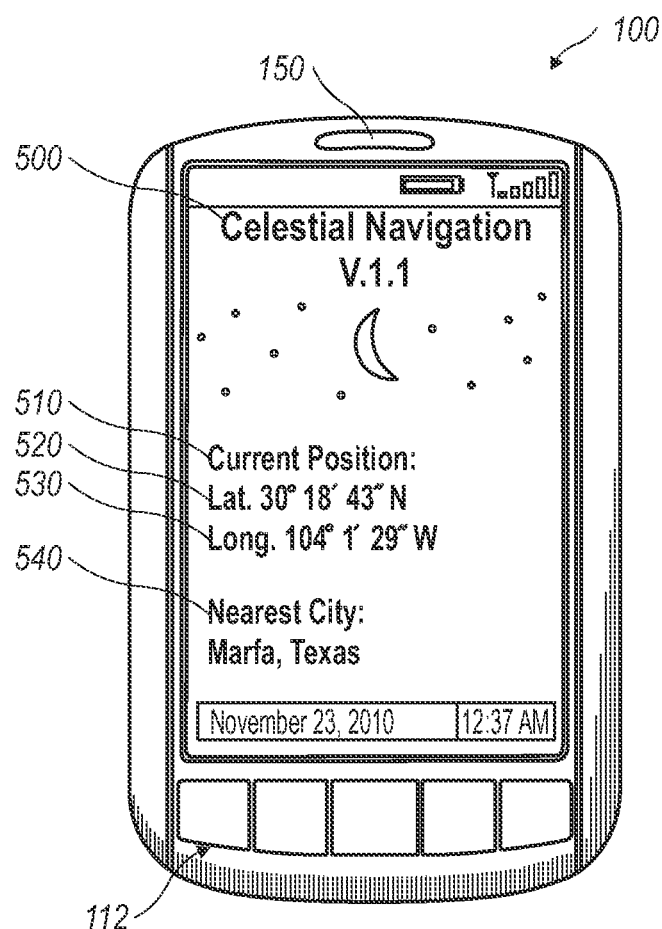
FIG. 5 is a position page of the celestial navigation program according to the present technology.

FIG. 5 provides an example of a position screen 500. Using the method as presented herein, the position of the electronic device 100 can be determined and displayed on the display 110 of the device 100. The current position 510 of the electronic device 100 is presented in latitude 520 and longitude 530. In the illustrated example, the latitude 520 of the electronic device 100 is 30 degrees, 18 minutes, and 43 seconds, North. The longitude 530 of the electronic device 100 is 104 degrees, 1 minute, and 29 seconds, West. In other implementations, alternative coordinates can be presented on the position screen 500. In the illustrated position screen 500, a nearest city 540 can be provided. As illustrated the coordinates as shown are the coordinates for Marfa, Tex.

Figure 6:
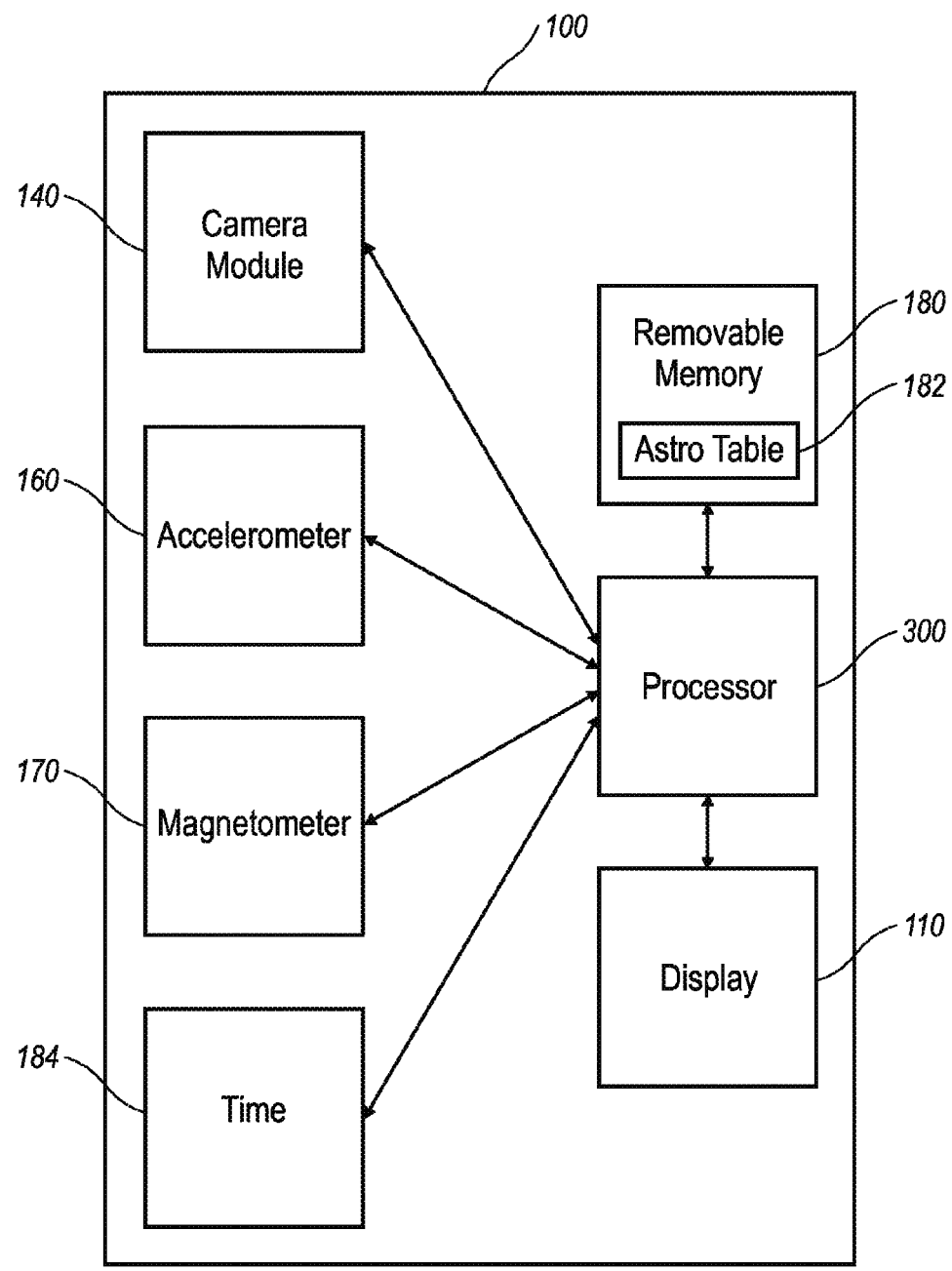
FIG. 6 is an block diagram representing some components of the electronic device according to the present disclosure.

An example of components of the electronic device 100 is presented in the block diagram FIG. 6. As illustrated, the electronic device 100 can include a processor 300, display 110, camera module 140, accelerometer 160, and magnetometer 170. While both an accelerometer 160 and magnetometer 170 are illustrated, in at least one implementation only the accelerometer can be present. In other implementations, other sensors can be implemented to provide an angularity of the device 100 with respect to the Earth as will be explained in relation to FIG. 7. The accelerometer 160 can be configured to provide data indicating a relative angle of the electronic device 100 with respect to the Earth in at least two dimensions. The accelerometer 160 can also be configured to provide angle data in three dimensions. Similarly, magnetometer 170 can be configured to provide data indicating a relative angle of the electronic device 100 with respect to the Earth in at least two dimensions. The magnetometer 170 can also be configured to provide angle data in three dimensions. When both the accelerometer 160 and magnetometer 170 are included in the electronic device 100, the accuracy of the measurement of the angle of the electronic device 100 with respect Earth can be increased. The relative angle of the electronic device 100 can also be characterized by orientation of the electronic device 100. The orientation of the device 100 can be described by pitch, roll and yaw. In other implementations, the orientation of the device 100 is used to calculate the angle of the device relative to the Earth.

Additionally, in at least one implementation, the electronic device 100 can include a removable memory 180. The removable memory can be any type of memory as described herein. Furthermore, the removable memory 180 can only have the database stored thereon or alternatively the removable memory 180 can be provided to include both the database and other data. As illustrated in FIG. 6, the removable memory 180 can contain an astronomical table database 182 for comparing the celestial object and determined angularity and time as determined by the electronic device 100. The astronomical table database 182 is used to determine the position of the electronic device according to the present disclosure. An example of the astronomical table 182 is the nautical almanac. Additionally, a time block 184 is illustrated. As mentioned above, in order to provide for an accurate comparison to the database the time at which the image is acquired is record. The time of the time block 184 can be obtained from an external source or based on an internal clock of the electronic device 100.

The camera module 140 can be on the rear side of the electronic device 100. The camera module 140 can include a camera lens coupled to an image sensor. The camera module 140 can include an image sensor adapted to convert the optical image captured by the camera module 140 into an electrical signal processed by the processing module 300. The image sensor can be a charge-coupled device (CCD), complementary metal-oxide-semiconductor (CMOS), a hybrid CCD-CMOS image sensor, or any other sensor adapted to convert an optical image to an electrical signal.

Figure 7:
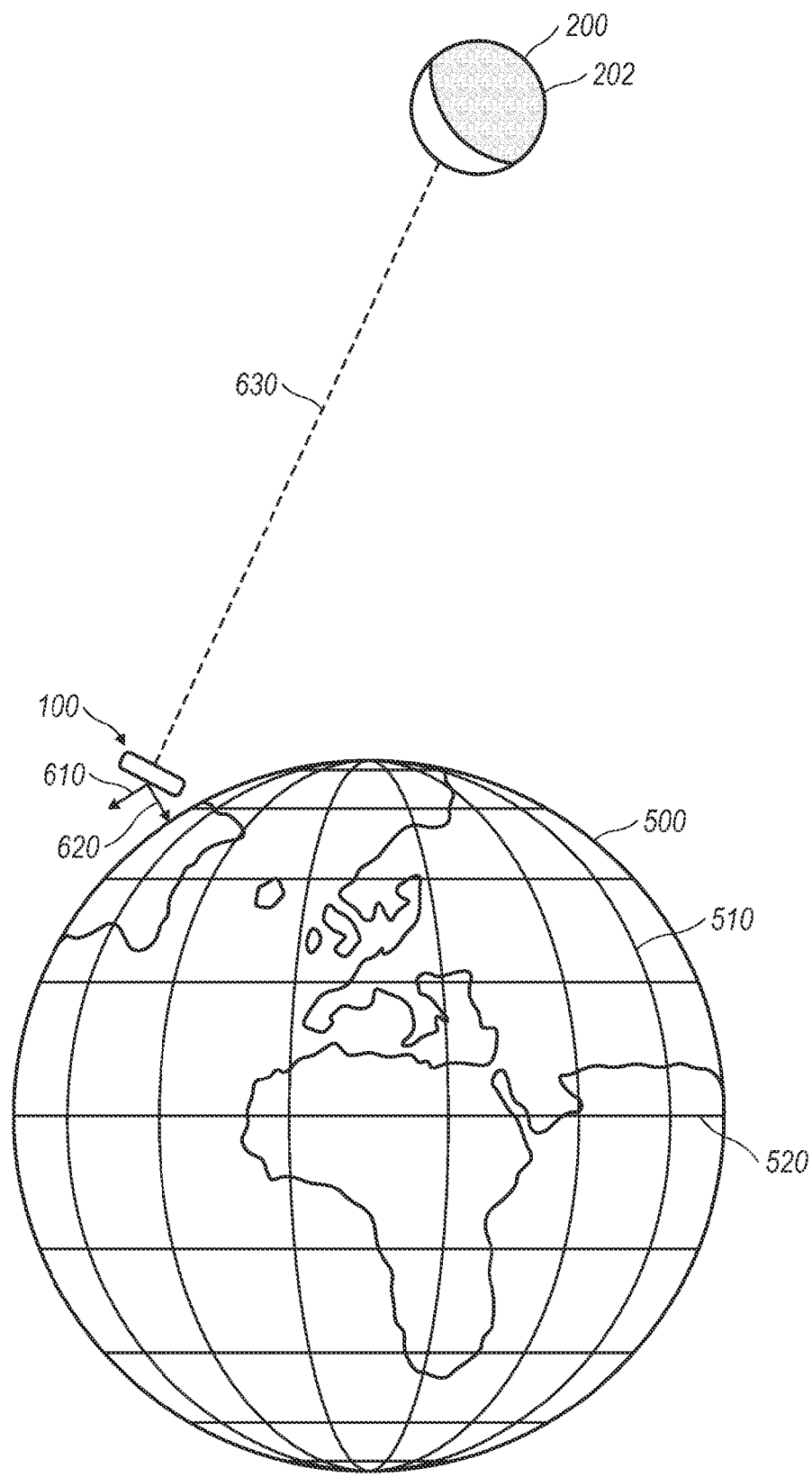
FIG. 7 is an exemplary diagram of the electronic device, Earth and celestial object according to the present technology.

FIG. 7 presents an illustration of the measurement of the angle of the device with respect to the Earth. FIG. 7 is provided for illustrative purposes only, and the items shown in FIG. 7 are not to scale. In FIG. 7, the celestial object 200 is the Moon 202. Lines of latitude 520 and longitude 510 are illustrated with respect to Earth 500. As illustrated, the relative angle of the device with respect to the Earth can be measured in at least two dimensions. A first dimension is indicated with respect to 610 and a second dimension is illustrated by 620. Using angles measured in the first dimension 610 and the second dimension, it can be determined the angle, illustrated by dashed line 630, of the Moon 202 with respect to the device position. Using the relative angle of the electronic device 100 in at least two dimensions relative to the Earth along with the celestial object 200, the Moon 202, a determination of the position of the device 100 can be made. For example, the latitude 520 and longitude 510 of the electronic device 100 can be determined.

Figure 8:
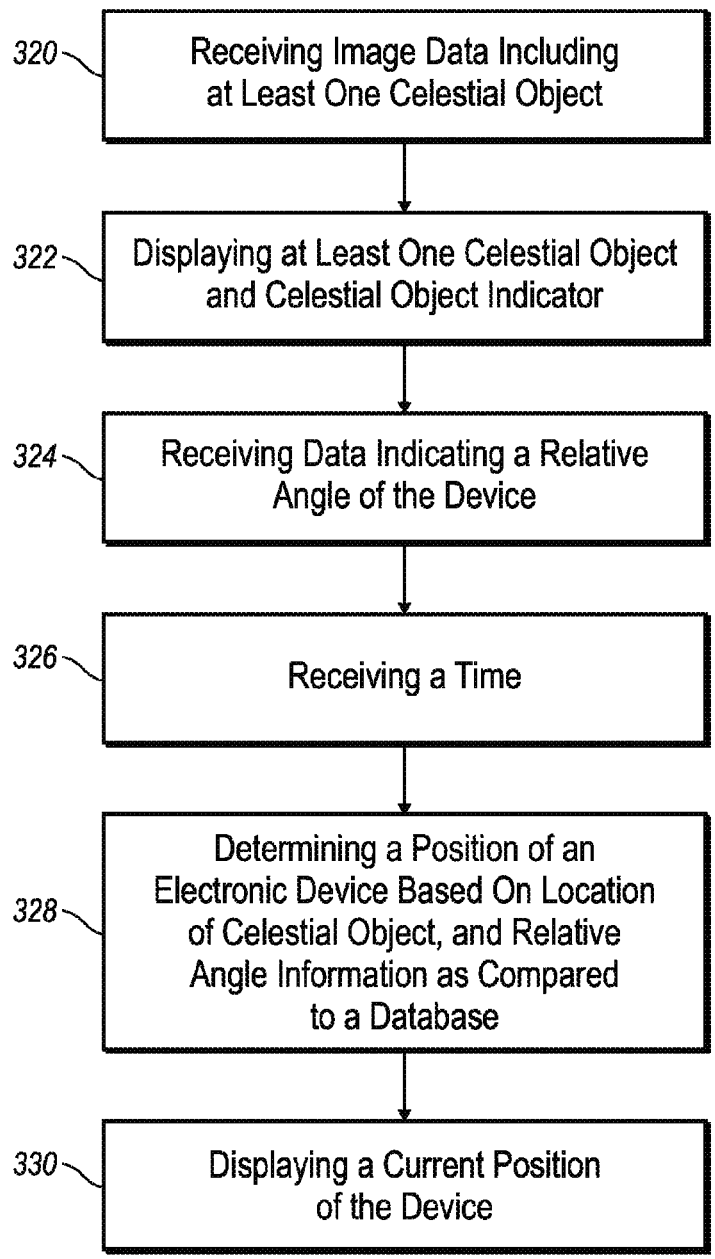
FIG. 8 is an illustration of an exemplary method according to the present technology.

Referring to FIG. 8, a flowchart of a method of determining the location of an electronic device 100 in accordance with an exemplary implementation is illustrated. The exemplary method 310 is provided by way of example, as there are a variety of ways to carry out the method. The method 310 described below can be carried out using an electronic device as described herein. Various elements of other figures presented above are referenced in explaining the exemplary method 310. Each block shown in FIG. 8 represents one or more processes, methods or subroutines, carried out in the exemplary method. The exemplary method 310 may begin at block 320. At block 320, the method 310 receives, at a processor 300, image data 111 containing at least one celestial object image 200. The method 310, at block 322, also causes the display of the at least one celestial object 200 and a celestial object indicator 220 for selecting a celestial object 200, on a display 110. At block 324, the method 310 receives, at a processor 300, data indicating a relative angle of the device 100, when the celestial object indicator 220 is overlaid on the at least one celestial object 200, with respect to the Earth 500 in at least two dimensions (610, 620). At block 326, the method 310 receives the time when the celestial object indicator 220 is overlaid on the at least one celestial object 200. At block 328, the method 310 determines a position of the electronic device 100 by comparing the location of the celestial object 200 in the image data 111 and relative angle information at the time of the indication to a database at least partially stored on the electronic device 100 in response to an indication that the celestial object indicator 220 is overlaid on the at least one celestial object 200. Furthermore, the method 310 at block 330 can cause a display of a current position of the electronic device 100. The method 310 can further include additional steps according to the disclosure as provided above. Additionally, in at least one implementation, alternative steps of the method 310 can be implemented as well as contemplated by this disclosure.

While the system and method of determining a position of an electronic device 100 have been described in relation to the exemplary implementations illustrated in FIGS. 1-6, one of ordinary skill in the art will appreciate that the limitations and elements illustrated herein can be optionally included or combined with one another to achieve the technical advantages of the claimed subject matter as described herein.

Figure 9:
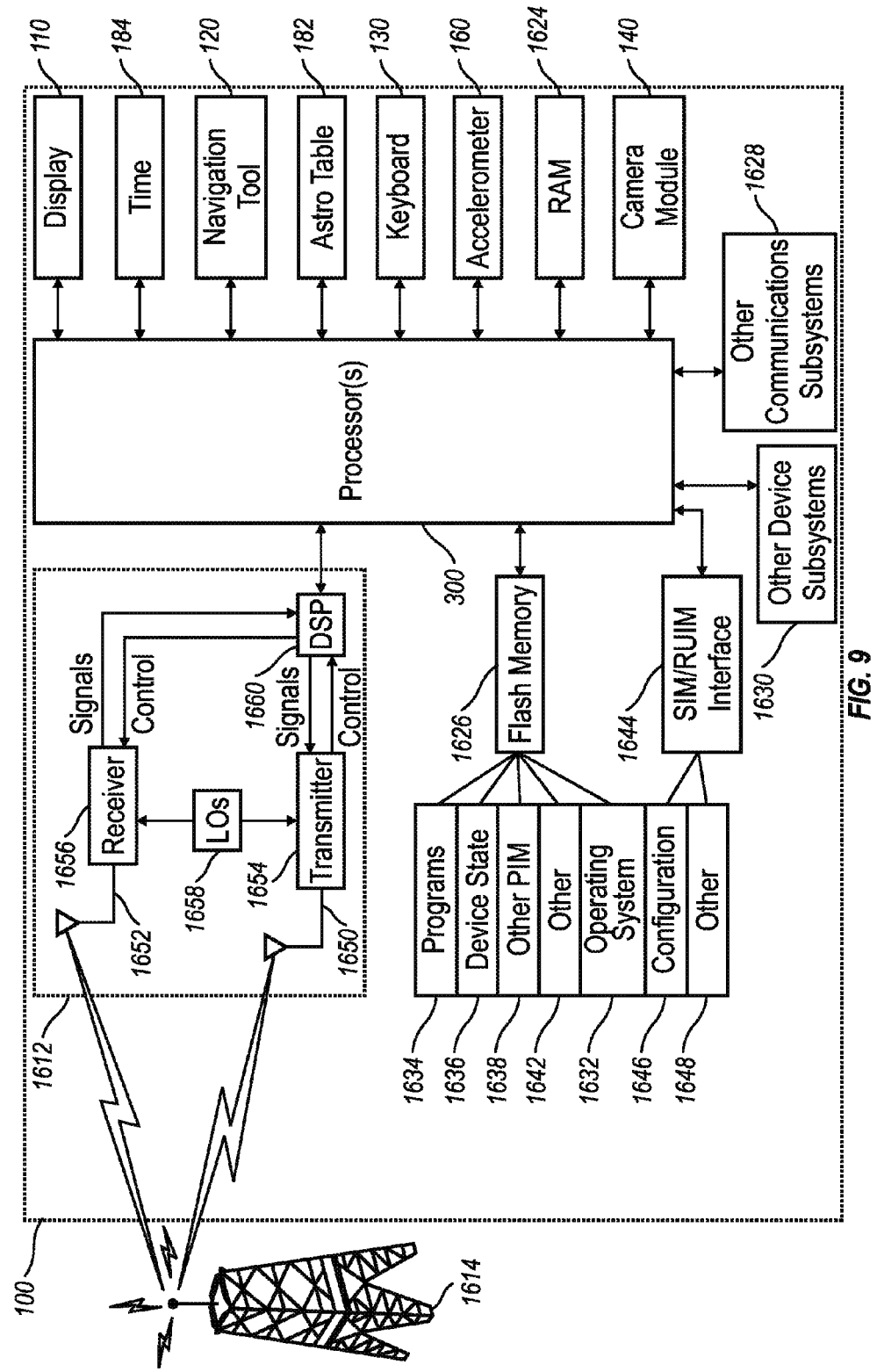
FIG. 9 is a block diagram representing an electronic device configured in accordance with an exemplary implementation of the present technology.

An exemplary implementation of an electronic device 100 is illustrated in FIG. 9. While the components of FIG. 9 are not all inclusive, FIG. 9 illustrates components that can be included on an electronic device 100 according to the present disclosure. Additional components are required to allow the electronic device 100 to function, but have been omitted for clarity.

As illustrated in FIG. 9, the electronic device 100 includes a communication subsystem 1630 to perform all communication transmission and reception with a wireless network 1614. A processor module 300 can be connected with an auxiliary input/output (I/O) subsystem 1628 which can be coupled to the electronic device 100. The processor module 300 can include one or more processors. Additionally, the processors can be micro-processors for example. In at least one implementation, the processor module 300 can be coupled to a serial port (for example, a Universal Serial Bus port) which can allow for communication with other devices or systems. The display 110 can be coupled to the processor module 300 to allow for displaying of information to a user of the electronic device 100. When the electronic device 100 is equipped with a keyboard 130, the keyboard 130 can also be connected with the processor module 300. The electronic device 100 can include a speaker, a microphone, random access memory (RAM) 1624, and flash memory 1626, all of which can be coupled to the processor module 300. Other similar components can be provided on the electronic device 100 as well and optionally coupled to the processor module 300. Other communication subsystems 1630 and other communication device subsystems 1628 are generally indicated as being functionally connected with the processor module 300 as well. An example of the communication subsystem 1612 is that of a short range communication system such as BLUETOOTH® communication module or a WI-FI® communication module (a communication module in compliance with IEEE 802.11 set of protocols) and associated circuits and components. The processor module 300 is able to perform operating system functions and enables execution of programs on the electronic device 100. In some implementations not all of the above components can be included in the electronic device 100.

The navigation tool 120 can take the form of a trackpad navigation tool, or a trackball, a thumbwheel, a navigation pad, a joystick, optical trackpad, touch-sensitive interface, or other I/O interface. While the above examples have been provided in relation to the navigation tool, other subsystems capable of providing input or receiving output from the electronic device 100 are considered within the scope of this disclosure. Other keys can be placed along the side of the electronic device 100 to function as escape keys, enter keys, volume control keys, scrolling keys, power switches, or user programmable keys, and can likewise be programmed accordingly.

As mentioned above, the electronic device 100 can also include a time clock 184, an astronomical table 182, and an accelerometer 160. The time clock 184 can be an internal clock of the electronic device 100. In other implementations, the time clock 184 can be updated by an external source such as a wireless network or the like. The astronomical table 182 provides a listing of relevant information which can be used in determining the position of the electronic device 100.

Furthermore, the electronic device 100 is equipped with components to enable operation of various programs, as shown in FIG. 9. For example, such a program can be a computer application programmed to determine location-based preferred media files or to retrieve directions and maps associated with the current position of the electronic device 100. In an exemplary implementation, the flash memory 1626 is enabled to provide a storage location for the operating system 1632, device programs 1634, and data. The operating system 1632 is generally configured to manage other programs 1642 that are also stored in memory 1626 and executable on the processor 300. The operating system 1632 honors requests for services made by programs 1634 through predefined program 1634 interfaces. More specifically, the operating system 1626 typically determines the order in which multiple programs 1634 are executed on the processor 300 and the execution time allotted for each program 1634, manages the sharing of memory 1626 among multiple programs 1634, handles input and output to and from other device subsystems 1630, and so on. In addition, users can typically interact directly with the operating system 1632 through a user interface which can include the keyboard 130 and display screen 110. While in an exemplary implementation the operating system 1632 is stored in flash memory 1626, the operating system 1632 in other implementations is stored in read-only memory (ROM) or similar storage element (not shown). As those skilled in the art will appreciate, the operating system 1632, device program 1634 or parts thereof can be loaded in RAM 1624 or other volatile memory.

In one exemplary implementation, the flash memory 1626 contains programs 1634 for execution on the electronic device 100 including an address book, a personal information manager (PIM) 1638, and the device state 1640. Furthermore, programs 1634 and other information 1648 including data can be segregated upon storage in the flash memory 1626 of the electronic device 100.

When the electronic device 100 is enabled for two-way communication within the wireless communication network 1614, the electronic device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 1614. Other systems may not require such identifying information. GPRS, UMTS, and EDGE use a Subscriber Identity Module (SIM) in order to allow communication with the communication network 1614. Likewise, most CDMA systems use a Removable User Identity Module (RUIM) in order to communicate with the CDMA network. The RUIM and SIM card can be used in multiple different electronic devices 100. The electronic device 100 can be able to operate some features without a SIM/RUIM card, but the electronic device will not be able to communicate with the network 1614. A SIM/RUIM interface 1644 located within the electronic device 100 allows for removal or insertion of a SIM/RUIM card (not shown). The SIM/RUIM card features memory and holds key configurations 1646, and other information 1648 such as identification and subscriber related information. With a properly enabled electronic device 100, two-way communication between the electronic device 100 and communication network 1614 is possible.

If the electronic device 100 is enabled as described above or the communication network 1614 does not require such enablement, the two-way communication enabled electronic device 100 is able to both transmit and receive information from the communication network 1614. The transfer of communication can be from the electronic device 100 or to the electronic device 100. In order to communicate with the communication network 1614, the electronic device 100 in the presently described exemplary implementation is equipped with an integral or internal antenna 1650 for transmitting messages to the communication network 1614. Likewise the electronic device 100 in the presently described exemplary implementation is equipped with another antenna 1652 for receiving communication from the communication network 1614. These antennae (1652, 1650 in another exemplary implementation are combined into a single antenna (not shown). As one skilled in the art would appreciate, the antenna or antennae (1652, 1650) in another implementation are externally mounted on the electronic device 100.

When equipped for two-way communication, the electronic device 100 features the communication subsystem 1612. As is understood in the art, the communication subsystem 1612 is modified so that the subsystem 1612 can support the operational needs of the electronic device 100. The subsystem 1612 includes a transmitter 1654 and receiver 1656 including the associated antenna or antennae (1652, 1650) as described above, local oscillators (LOs) 1658, and a processing module which in the presently described exemplary implementation is a digital signal processor (DSP) 1660.

The present disclosure contemplates that communication by the electronic device 100 with the wireless network 1614 can be any type of communication that both the wireless network 1614 and electronic device 100 are enabled to transmit, receive and process. In general, these can be classified as voice and data. Voice communication generally refers to communication in which messages for audible sounds are transmitted by the electronic device 100 through the communication network 1614. Data generally refers to all other types of communication that the electronic device 100 is capable of performing within the constraints of the wireless network 1614.

Example device programs that can depend on such data include email, contacts and calendars. For each such program, synchronization with home-based versions of the programs can be desirable for either or both of the program's long term and short term utility. As an example, emails are often time sensitive, so substantially real time synchronization can be desired. Contacts, on the other hand, can be usually updated less frequently without inconvenience. Therefore, the utility of the electronic device 100 is enhanced when connectable within a communication system, and when connectable on a wireless basis in the network 1614 in which voice, text messaging, and other data transfer are accommodated.

Even more, the present technology can take the form of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Those of skill in the art will appreciate that other implementations of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Implementations may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, and non-transitory memory. Current examples of optical disks include compact disk-read only memory (CD-ROM), compact disk-read/write (CD-R/W), DVD, and Blu Ray™.

Implementations within the scope of the present disclosure may also include tangible and/or non-transitory computer-readable storage media for carrying or having computer-executable instructions or data structures stored thereon. Additionally, non-transitory memory also can store programs, device state, various user information, one or more operating systems, device configuration data, and other data that may need to be accessed persistently. Further, non-transitory computer-readable storage media expressly exclude media such as energy, carrier signals, electromagnetic waves, and signals per se. Such non-transitory computer-readable storage media can be any available media that can be accessed by a general purpose or special purpose computer, including the functional design of any special purpose processor as discussed above. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Both processors and program code for implementing each medium as an aspect of the technology can be centralized or distributed (or a combination thereof) as known to those skilled in the art.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/ server configurations. In some implementations, the data processing system is implemented using one or both of FPGAs and ASICs.

One of ordinary skill in the art will appreciate that the features in each of the figures described herein can be combined with one another and arranged to achieve the described benefits of the presently disclosed system and method of determining a position of an electronic device. Additionally, one of ordinary skill will appreciate that the elements and features from the illustrated implementations herein can be optionally included to achieve the described benefits of the presently disclosed system and method of determining the position of an electronic device. Various modifications to and departures from the disclosed implementations will occur to those having skill in the art.

What is claimed is:

1. A method for determining a position of an electronic device, comprising:
   receiving, at a processor in the electronic device, image data containing at least one celestial object image;
   causing, by the processor, a display of the at least one celestial object and a celestial object indicator for selecting a celestial object, on a display;
   receiving, at the processor, data indicating a relative angle of the device, when the celestial object indicator is overlaid on the at least one celestial object, with respect to the Earth in at least two dimensions;
   receiving, by the processor, the time when the celestial object indicator is overlaid on the at least one celestial object;
   determining, by the processor, a position of the electronic device by comparing the location of the celestial object in the image data and relative angle information at the time of the indication to a database at least partially stored on the electronic device in response to an indication that the celestial object indicator is overlaid on the at least one celestial object; and
   causing, by the processor, a display of a current position of the electronic device.

2. The method of claim 1, wherein the angle data is received from at least one sensor.

3. The method of claim 2, wherein the least one sensor is at least one of an accelerometer and a magnetometer.

4. The method of claim 1, wherein the angle data contains three dimensions.

5. The method of claim 1, further comprising displaying a list of celestial objects and receiving a selection of one of the listed celestial objects to be used in the comparison.

6. The method of claim 5, wherein the celestial object indicator displayed is selected in dependence upon a selected celestial object.

7. The method of claim 6, wherein the celestial object indicator is sized to provide for substantially complete overlaying of the celestial object indicator on the at least one celestial object.

8. The method of claim 1, wherein the celestial object is one of a star, planet, Moon and Sun.

9. The method of claim 1, wherein the indication that the celestial object indicator is overlaid on the at least one celestial object is based upon an input received from a predetermined key.

10. The method of claim 1, wherein the indication that the celestial object indicator is overlaid on the at least one celestial object is determined based upon determining a vector relative to the brightest point on the display relative to the celestial object indicator.

11. The method of claim 1, wherein the celestial object is selected based upon the time at the electronic device.

12. The method of claim 11, wherein the celestial object is chosen as the Sun if the time is during daylight hours and the celestial object is one of the Moon or North Star if the time is during the night.

13. An electronic device comprising:
    a display; and
    a processor coupled to the display, the processor configured to execute instructions to:
      receive image data containing at least one celestial object;
      cause a display of the at least one celestial object and a celestial object indicator for selecting a celestial object, on the display;
      overlay the celestial object indicator on the at least one celestial object;
      receive data indicating a relative angle of the device, when the celestial object indicator is overlaid on the at least one celestial object, with respect to the Earth in at least two dimensions;
      determine the time when the celestial object indicator is overlaid on the at least one celestial object;
      determine a position of the electronic device by comparing the location of the celestial object in the image data and relative angle information at the time of the indication to a database at least partially stored on the electronic device in response to an indication that the celestial object indicator is overlaid on the at least one celestial object; and
      cause a display of a current position of the electronic device.

14. The electronic device of claim 13, further comprising a camera module configured to acquire said image data of at least one celestial object.

15. The electronic device of claim 13, further comprising at least one sensor for obtaining the relative angle of the electronic device.

16. The electronic device of claim 15, wherein the at least one sensor is at least one of an accelerometer and a magnetometer.

17. The electronic device of claim 13, further comprising a removable memory device, wherein the removable memory device stores the database.

18. The electronic device of claim 13, further comprising a wireless communication module, wherein the wireless communication module provides connectivity to a remote database.

19. The electronic device of claim 13, wherein the wireless communication module is one of a Wifi module and cellular module.

20. A non-transitory computer readable medium, comprising instruction to cause a processor to:
    receive image data containing at least one celestial object;
    cause a display of the at least one celestial object and a celestial object indicator for selecting a celestial object, on the display;
    overlay the celestial object indicator on the at least one celestial object;
    receive data indicating a relative angle of the device, when the celestial object indicator is overlaid on the at least one celestial object, with respect to the Earth in at least two dimensions;
    determine the time when the celestial object indicator is overlaid on the at least one celestial object;
    determine a position of the electronic device by comparing the location of the celestial object in the image data and relative angle information at the time of the indication to a database at least partially stored on the electronic device in response to an indication that the celestial object indicator is overlaid on the at least one celestial object; and
cause a display of a current position of the electronic device.

\* \* \* \* \*